(12) United States Patent
Botan et al.

(10) Patent No.: US 8,084,880 B2
(45) Date of Patent: Dec. 27, 2011

(54) CONCENTRATOR FOR WIND POWER STATION AND AEOLIAN GRID

(76) Inventors: Corneliu Gheorghe Botan, Iasi (RO); Dumitru Cuciureanu, Iasi (RO)

( * ) Notice: Subject to any disclaimer, the term of this patent is extended or adjusted under 35 U.S.C. 154(b) by 328 days.

(21) Appl. No.: 12/442,949

(22) PCT Filed: Jul. 24, 2007

(86) PCT No.: PCT/RO2007/000011
§ 371 (c)(1),
(2), (4) Date: Mar. 26, 2009

(87) PCT Pub. No.: WO2008/039089
PCT Pub. Date: Apr. 3, 2008

(65) Prior Publication Data
US 2010/0213719 A1      Aug. 26, 2010

(30) Foreign Application Priority Data
Sep. 28, 2006   (RO) .............................. A-2006-00751

(51) Int. Cl.
 F03D 9/02         (2006.01)
(52) U.S. Cl. .......................................... 290/55; 415/2.1
(58) Field of Classification Search .............. 290/43–44, 290/54–55; 415/2.1, 4.1, 4.2, 4.4, 4.5, 4.3, 415/7, 907–908, 905, 208.1; 416/132 B, 416/7; 60/398
See application file for complete search history.

(56) References Cited

U.S. PATENT DOCUMENTS

| | | | | |
|---|---|---|---|---|
| 3,883,750 A | * | 5/1975 | Uzzell, Jr. ...................... | 290/55 |
| 4,079,264 A | * | 3/1978 | Cohen .............................. | 290/55 |
| 4,471,612 A | * | 9/1984 | Buels .............................. | 60/398 |
| 4,516,907 A | * | 5/1985 | Edwards ......................... | 415/4.5 |
| 4,915,580 A | * | 4/1990 | Obidniak ....................... | 415/2.1 |
| 7,147,428 B2 | * | 12/2006 | Lamont ............................ | 415/1 |
| 7,425,772 B2 | * | 9/2008 | Novo Vidal ..................... | 290/52 |
| 2008/0061559 A1 | * | 3/2008 | Hirshberg ....................... | 290/55 |
| 2008/0093861 A1 | * | 4/2008 | Friesth et al. ................... | 290/55 |
| 2010/0270802 A1 | * | 10/2010 | Presz et al. ..................... | 290/52 |

FOREIGN PATENT DOCUMENTS

| | | |
|---|---|---|
| DE | 196 44 917 | 4/1998 |
| DE | 10 2005 060 818 | 9/2006 |
| EP | 0 167 694 | 1/1986 |
| FR | 1 190 124 | 10/1959 |
| FR | 2 450 362 | 9/1980 |
| FR | 2 725 501 | 4/1996 |

OTHER PUBLICATIONS

International Search Report.

* cited by examiner

*Primary Examiner* — Michael Zarroli
(74) *Attorney, Agent, or Firm* — Moetteli & Associés SàRL

(57) ABSTRACT

A fixed convergent collecting concentrator is provided. The concentrator contains two spaced-apart, co-axial, approximately horizontal, concentric plates with approximately circular shape centered on a vertical axis. The space between said plates is separated by vertical partition walls radially disposed about the axis thereof. The walls connect to the plates to form several sectors such that, irrespective of the direction of the wind, certain sectors collect and concentrate the air flow which enters the respective sectors. Each sector is connected to an intermediate tube which is in fluid communication with an accumulating tube, thus forming a system of tubes which is oriented in a common direction, optionally towards the ground. A turbine or other engine adapted for energy conversion being placed inside the concentrator or tubes.

15 Claims, 3 Drawing Sheets a-a

# CONCENTRATOR FOR WIND POWER STATION AND AEOLIAN GRID

The present application is the US National Stage of PCT Patent Application No. PCT/RO2007/000011 filed 24 Jul. 2007 which claims priority under the Paris Convention to Romanian Patent Application No. a-2006-00751 filed 28 Sep. 2006.

This invention pertains to a method and a system which uses the wind energy or the energy of a gas which moves with variable directions and speeds, and which is able to transform such energy into electrical energy in a turbine—generator ensemble, or in other useful type of energy—mechanical or thermal.

It is a common knowledge that there are different types of wind turbine, with vertical or horizontal axis, used for electrical generators moving. The vertical axis turbines have the advantage that they allow the placement of the generator at the basis of the tower of the wind station, but they are more complicated and less efficient. Horizontal axis turbines are preferred nowadays. Generally, the axis is oriented in parallel with the wind direction. Some helicoidally blades (three, in most cases) are fixed on its spindle, and each point of a blade, while moving, makes a circle in a plane perpendicular on the spindle direction. The drawback of these turbines is the extreme length of the blades (depending on power). This length is necessary because of the reduced use of the wind flux energy which corresponds to the diameter of the propeller (only a small part of this flux comes in contact with the blades). Moreover, only a part of the force of the air particles which come across the blades is transformed into a useful torque, since the torque is created only by a force component on a certain direction, depending on the propeller curvature in the contact zones. Other drawbacks of the wind stations are well known: they have reliability problems; it is difficult to repair them because they are located at big heights; they do not ensure constant power, torque, frequency etc.

As of now, references to simple independent collecting concentrators or to its applying in different manner in the systems of wind energy conversion do not exist. Also, there are no references about the aeolian grids, which interconnect equipment which use the wind energy.

SUMMARY OF THE INVENTION

The concentrator (also named collecting concentrator) for turbine and the aeolian grid described in this invention eliminate the above mentioned drawbacks. In order to make a more complete use of the kinetic energy of the wind or of the gas which comes across a certain surface, the concentrator (fixed or orientable by wind direction) collects the air flux. The collecting concentrator has an input section with an area much bigger then one of the output section and this fact ensures the increase of the speed of the air which is sent in an encapsulated turbine (which has a stator and a rotor, like steam or gas turbine) or in another turbine type, or in another air consumer. The turbine drives an electric generator or another engine which develops a useful work, or ensures a useful thermal energy, or the air storage. In order to ensure a constant generated power, one resort to the air accumulation and/or to the achievement of an aeolian grid. This grid is supplied by one or more concentrators and supplies in his turn one or more turbines or equipment which uses the air energy, or can store it.

BRIEF DESCRIPTION OF THE DRAWINGS

The figures present, together with the specification, four embodiments of the invention, in which.

DETAILED DESCRIPTION OF THE PREFERRED EMBODIMENT(S)

Figure 1:
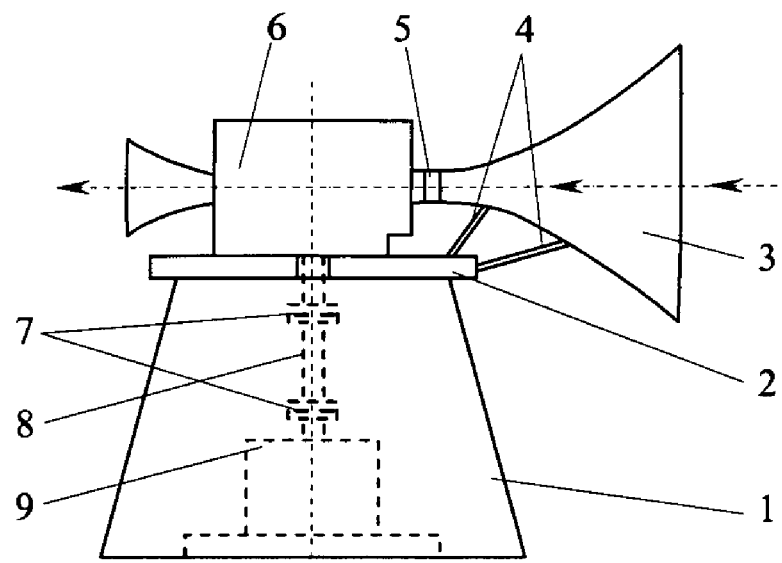
FIG. 1 is a side view of an orientable collecting concentrator and turbine for placing on a tower.

In FIG. 1 (for the first example of achievement of the invention), the tower 1 of the wind station contains in its upper side an orientable platform 2. The platform can be rotated and this rotation can be achieved in various ways, e.g. by using an automatic positioning system, similar with those used in already existing wind stations for positioning the propeller plan. Simultaneously with the platform it is positioned the concentrator 3, fixed on the platform with support bars 4, and also the intermediate tube 5 and the turbine 6, fixed on the platform. The arrows in FIG. 1 indicate the direction of the air flux. The spindle of the turbine transmits its movement, via the couplers 7 and an intermediate axis 8, to an electrical generator 9 (or to the working machine driven by turbine). Any type of turbine can be used, but especially one encapsulated into a carcase (that is the blades do not rotate in exterior, as in the case of actual wind turbines), having a stator with nozzles and a rotor with blades. It can be a gas, a pressure turbine, or a similar one.

The collecting concentrator 3 has an input section with an area significantly bigger then the one of the output section (which supplies the turbine). In this way, the movement of the turbine is generated by a large quantity of air, circulating at high speed, having approximately the value $v_t = kv_v$, where $v_v$ is the mean speed of the wind and k depends on the ratio between the areas of the input and output sections of the concentrator (supposing that the last one is equal with the area of the input in the turbine). Therefore, the fluid which enters in turbine has a great power, since a large quantity of air is captured and used in totality. One can thus achieves plants with very high power and efficiency, since the efficiency of an encapsulated turbine is greater then that of a current wind turbine. The explanation for this is simple: the latter type of turbines uses only a small part of the power of the air which intersects the surface covered by the blades in every moment. Moreover, the high air speed in the input of the turbine ensures a high angular speed. This will make mechanic multipliers or electric generators with an increased number of poles useless. If a vertical axis turbine is used, the generator can be placed in the lower part of a tower. Alternatively, the generator can be placed on the platform—the axis of the turbine and of the generator being horizontal. The tower can have a rather small height, because a great quantity of air can be captured by increasing the dimensions of the collecting concentrator. Thus, it is unnecessary to place the wind turbine at great heights.

The turbine can run with a lower speed limit $v_{ti}$ (under this limit the system can not operate) and with an upper speed limit $v_{ts}$ (above this limit the rated loads of the turbine and of the generator are exceeded and the wears becomes excessive). These air speed limits correspond to the inferior and superior limits of the wind speed ($v_{vi}=v_{ti}/k$ and $v_{vs}=v_{ts}/k$, respectively). Note that the speed $v_{vi}$ is significantly smaller then the minimum speed of the currently existing wind power stations. In other words, the proposed wind power station is able to run with smaller wind speeds than the current low limits. If the wind speed is between $v_{vi}$ and $v_{vs}$, the turbine operates with a load smaller then the maximum one. If $v_v=v_{vs}$, the turbine operates with the admissible speed limit. This is generally equal with the rated one. The load of the turbine depends on one of the generator. If the wind speed is greater than $v_{vs}$, one has to limit the angular speed of the turbine at the maximum admissible value $v_{ts}$. This can be obtained by rotating the concentrator; since in this case its input section is not perpendicular on the wind direction, a more general equation needs to be taken into consideration: $v_t=ckv_v$, where c is a coefficient depending on the position of the collecting concentrator. This coefficient has quasi-sinusoidal variation with the angle between the wind direction and plan of the input section of the concentrator (c=1 when the angle is $\pi/2$ rad and c=0 when this plane is parallel with the wind direction). The control system of the position of the concentrator is designed so that it ensures the turbine steady state rotating speed to the desired value, that means the ensuring the air speed at the input of the turbine to the value $v_{ts}$. Obviously, for small wind speeds, the system does not have the capability to ensure this value, but it can still generate useful energy. Note that the system can operate no matter how high the wind speed is, and the speed of the turbine can always be controlled in these circumstances. Therefore, the system will never have to be stopped because of high wind speeds.

FIG. 1 and the corresponding explanations pertain only to the strictly necessary elements that show the novelty of the invention, and do not present other elements which are used, as a rule, in a wind power station. The described component elements can be of any type, they can build out of any building materials and any methods of attaching these components can be used. Also, the shapes of the input and output sections of the concentrator can be any. These observations are also pertinent to the next examples of applications of the invention.

Certain supplementary elements can be introduced in order to improve the system. For instance, an expanding chamber of a relatively small volume can be inserted between the concentrator and the turbine. This chamber attenuates the effect of high frequency fluctuations of the wind speed. It is also possible to introduce, as an auxiliary element, a supplementary support bar for concentrator. This bar turns around simultaneously with the concentrator, on a special circular rolling track, placed on the surface of the earth. This way, the burden which the rotating platform placed on the tower must bear is diminished. Another way to achieve this burden decrease in case of very high wind speed is to create certain apertures in the collecting concentrator. For this purpose, some sections of the walls of the concentrator must be movable so that the total wind force exerted on the concentrator can be diminished.

Figure 2:
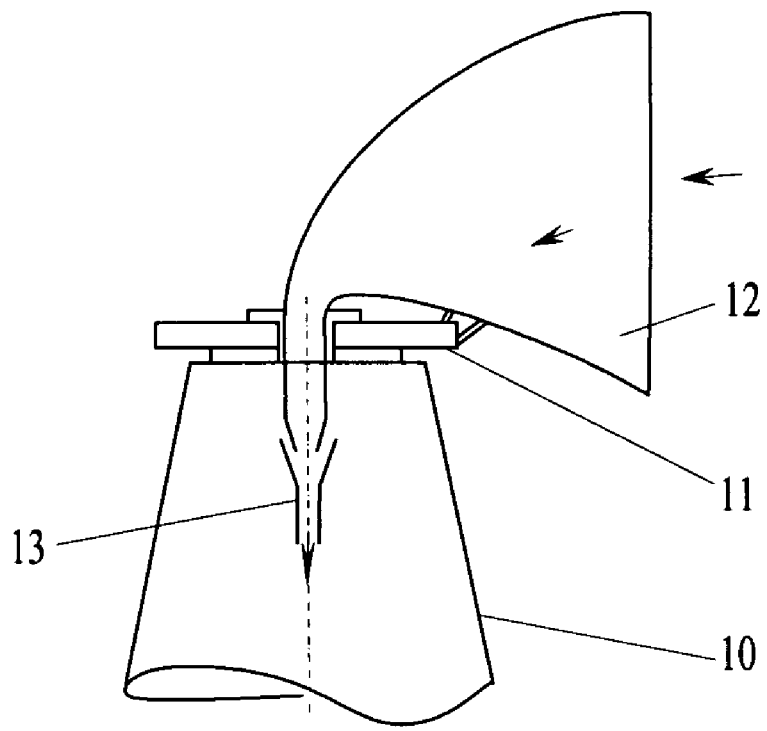
FIG. 2 is a side view of an alternate embodiment of the wind station of the invention having an orientable collecting concentrator for placing on a tower.

In the second example of application of the invention only the collecting concentrator should be placed on the tower. The turbine is placed on the ground and directly coupled with the generator or with other engine, without of an intermediate axle. The structure is indicated in the FIG. 2, where 10 represents the tower with the rotating platform 11. The collecting concentrator 12 is fixed on this platform (the collecting concentrator was depicted in another manner than in FIG. 1, in order to indicate that the invention accommodates different profiles for the concentrator). The intermediate conduit from the concentrator is vertical and passes through the central zone of the rotating platform. The air is suppressed in the absorbing pipe 13 and then guided to the turbine or to other using device. It is advisable to introduce a sealing system between the rotating intermediate conduit of the concentrator and the fixed absorbing pipe (for instance, a labyrinth sealing), in order to avoid air losses. The turbine and the generator (or other air using devices) can be placed in the tower, on the outer surface of the tower, on the ground level, or underground. The turbine and generator can have horizontal axes. The tower itself can be substituted with a support stud (with a lattice structure) and only the positioning mechanism of the platform must get an impervious coating, in order to be protected from atmospheric agents. All the aforementioned observations pertaining to the tower height, speed control, additional elements which can be attached to the basic construction, etc. are valid. Moreover, another important fact is that the control of the air flow can be also ensured with a valve. In this case, the unused air can be evacuated, sent to another plant, or stored.

Figure 3A:
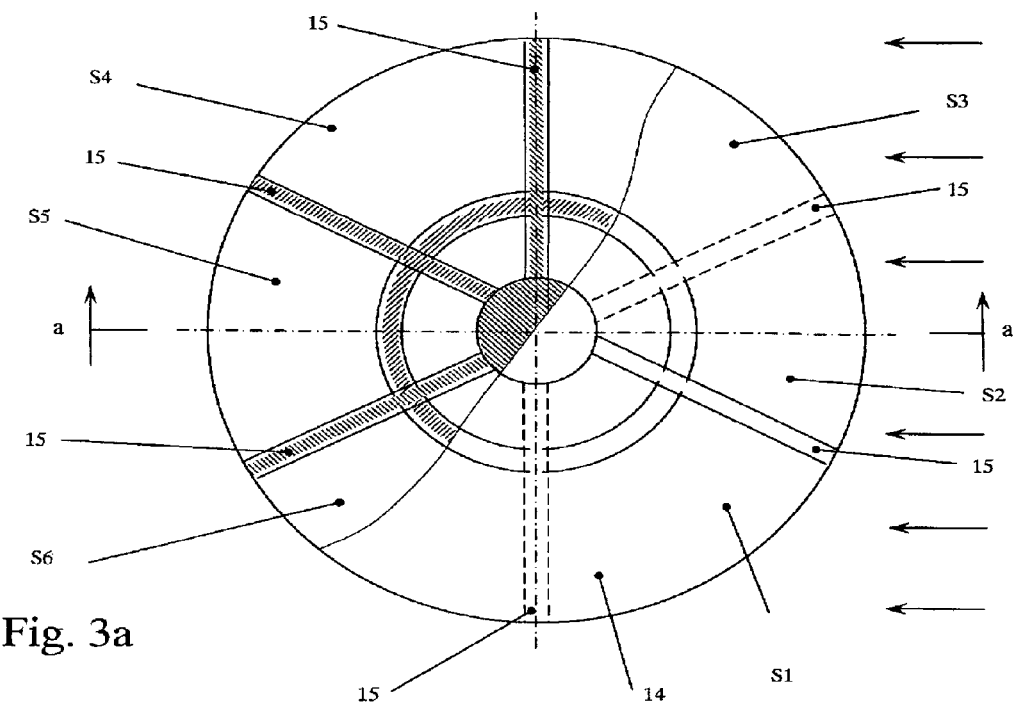
FIG. 3a is a top view of a second alternate embodiment of the wind station of the invention having only a fixed collecting concentrator for placing on a tower.
Figure 3B:
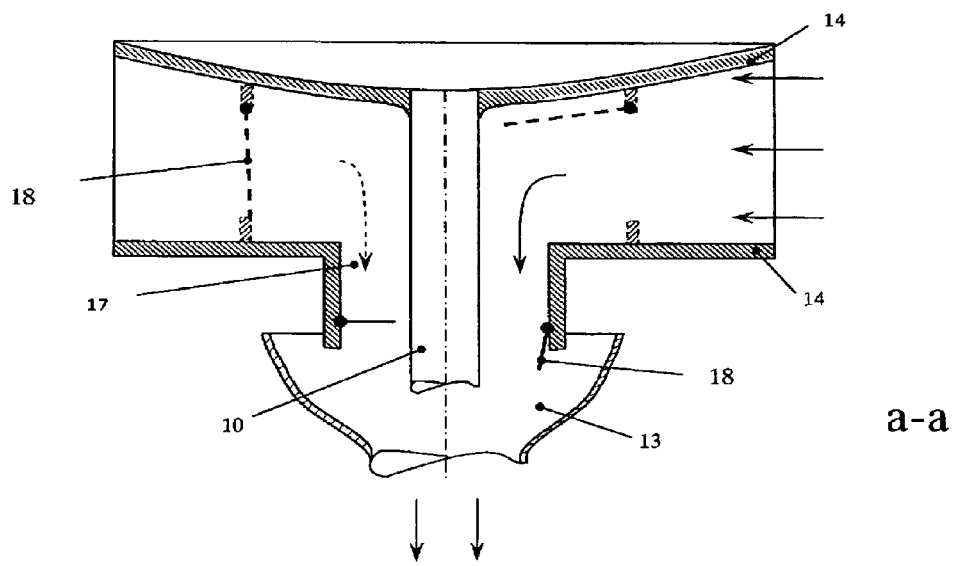
FIG. 3b is a schematic representation of a side view of the second alternate embodiment of FIG. 3a., containing a fixed collecting concentrator.

In the third example of application of the invention only a fixed collecting concentrator is placed on the tower, the turbine or other using devices should be placed at the basis of the tower. The collecting concentrator has a quasi cylindrical or truncated cone shape, having the same axis as the sustainable tower (FIGS. 3a and 3b). The bases of this cylinder are two plates 14 of a relatively high size, with a disk shape (this shape is not compulsory), and outer contour of circular, polygonal or any other form. The plates are placed in horizontal planes or are inclined and are sustained by the tower or the stud. The centres of the plates are placed on the tower axis. The tower passes through a central opening of the lower plate. The approximately cylindrical space between the plates is divided in certain sectors $S_1, \ldots, S_j$ (j=6 in FIG. 3a) by vertical partition walls 15. Each sector has on its inner side (near the central axis) a terminal outflow tube or intermediate passage 17. These tubes are oriented towards the ground, parallel with the tower. The terminal tubes can be inside or outside of the tower, surrounding it (the latter variant is represented in FIGS. 3a and 3b). All intermediate passages 17 of these segments S1 to S6 discharge the air in an absorbing pipe or accumulating tube 13. Depending on the wind direction, the air fills in certain sectors (the active ones). The other sectors are left inactive. Afterwards, the air flows in the absorbing pipe or accumulating tube 13 via the intermediate passages 17. In the case of the collecting concentrator with six sectors (as in the FIGS. 3a and 3b), three or four segments are always active—in the last case, two of the segments do not work at full capacity. For a certain wind speed, the air quantity which enters in the collecting concentrator in each moment (and thus the available power) is approximately proportional with the diameter of the collecting concentrator and with the distance between its horizontal plates. Every sector has the surface of the output section smaller then the surface of the input section. The air-passing section can be further decreased in the intermediate passages 17 and the accumulating tube 13. In order to prevent the air to come back through the intermediate passages of the inactive sectors, these tubes must be blocked. This can be done, for example, by introducing some clack or one way valves 18 on every intermediate passage 17; these clacks 18 (shown only schematically in FIG. 3b) will be opened under the air pressure only from the active sector to the absorbing pipe. The clack valves 18 are preferably located at the end of the intermediate passages 17. They are in a horizontal position in the normal closed state. However, they can be also placed in a vertical position during their normal closed state at the tip of the sectors (upstream to intermediate passages 17).

The control of the rotating speed of the turbine can be achieved by modifying the air passing section, simultaneously with the evacuation or storage of the air surplus. Thus, one can introduce a valve in the absorbing pipe and another valve in an auxiliary tube (derived from the absorbing pipe, and designated for evacuation of air excess.) Also, one can operate, for the same purposes, over the partition walls of the sectors of the collecting concentrator. For instance, it is possible to move a part of the separating walls of the concentrator in a radial direction, parallel with their fixed part, or to introduce folding walls, rotating around their horizontal edge. In the both cases, only a part from the air intersecting the collecting concentrator is used. A maximum opening of the walls can be useful in case of very heavy winds, in order to limit the burden acting on concentrator. The concentrator can be sustained with supplementary studs (at least three) if the diameter of the concentrator is large. It is even possible to renounce to the central tower. This can be replaced by several symmetrically placed studs (eventually placed on the same verticals as the partition walls 15). This way, the central axis zone becomes available for the system of pipes which leads the air to the turbine or to other using devices, which can be placed under the absorbing pipe. The sustainable studs can have small heights, since the concentrator can be placed near the ground level (in this case, the pipes system must be placed underground). One can range the collecting concentrator in tiers.

The collecting concentrator presented in the above three invention examples of application may also have other shapes and forms then the one presented above. What it is essential is the fact that it is an independent device which can be attached to various other elements or systems (see also the forth application example of the invention) in order to collect a big quantity of air, to use its kinetic energy, or to store it. The passing section of this concentrator gradually decreases, so that the air speed increases. The connection with other components is very simple (an intermediate tub) in the first example, but in the main applications of the invention, when all engines are placed near the ground level, the connections imply curved intermediate/terminal tubes and the passing to an absorbing pipe, with adequate means for avoiding the air losses. Besides the already mentioned components, one can also attach inside of the concentrator other component parts (and this is applicable to all three aforementioned examples):

nets (grates) in order to avoid the entry of external objects;
sets of parallel leafs (the sets may have various directions) in order to laminate the air flux in case of wind storms.

Multiple implementation variants are possible for each of the aforementioned applications of the invention. These variants pertain mainly to the final utilization of the captured air (nevertheless, some of these variants may be implemented effortlessly in some of these examples but with more difficulties in others). The first (basic) variant pertains to the conversion of wind energy in electrical energy using an encapsulated turbine—generator set. The second variant consists of the utilization of any working machine—thus, wind energy becomes mechanical energy. A third variant pertains to the conversion of the wind energy in both electrical and mechanical ones. This can be achieved when a generator and a working machine are placed on the axis of the turbine. The couplings between the turbine and these two elements can be fixed or controlled, the latter case allowing for an increased flexibility in utilization, depending on the needs and available energy. The forth variant is to directly use the pressure created by wind, without the utilization of a turbine. In this case, the absorbing pipe from FIG. 2 (or from the third application example of the invention) fills a buffer reservoir, from which the air is taken over through valves. The buffer reservoir is filled via a safety valve to the maximal admissible pressure. After that, the air admission is blocked by using a valve, or by placing the collecting concentrator in an adequate position. The fifth proposed variant is to build the collecting concentrator or the absorbing pipe with multiple outputs, equipped with valves. Each of this output will supply a device, which can be of any of the types from the aforementioned variants. The sixth variant is to use the wind energy for heating or cooling purposes. The heating can be achieved, for instance, through friction in a hydraulic or dry brake. The cooling can be achieved by an operating compressor in a cooling circuit, but there are also other ways to achieve this. In all cases, the drive is made by the turbine or by the air pressure from a buffer reservoir. The conversion based on the electrical energy is not considered here, since this was discussed above (the first variant). The seventh variant proposes to transfer the air (or part of it) into an accumulator reservoir. The energy thus stored is proportional with the air pressure and the with the reservoir volume. If one wishes to accumulate air at a pressure greater than the one ensured by concentrator, a centrifugal compressor has to be introduced. This compressor will be driven by the main turbine, or by a supplementary turbine (possibly of a smaller power). An accumulator reservoir with reasonable dimensions can ensures an available energy for a rather long period of time. For instance, let us suppose that the wind station is designed so that the rated power is obtained for a wind speed of 10 m/s and the pressure in reservoir is 10 bars. If the collecting concentrator and the accumulator reservoir have similar dimensions—the same heights and the same diameter D (supposing, for instance, that the concentrator is similar with that described in the third example of application and it is placed on the reservoir)—then the rated power can be ensured for an approximately time T=0.25 D (where T is expressed in hours and D in meters).

Figure 4:
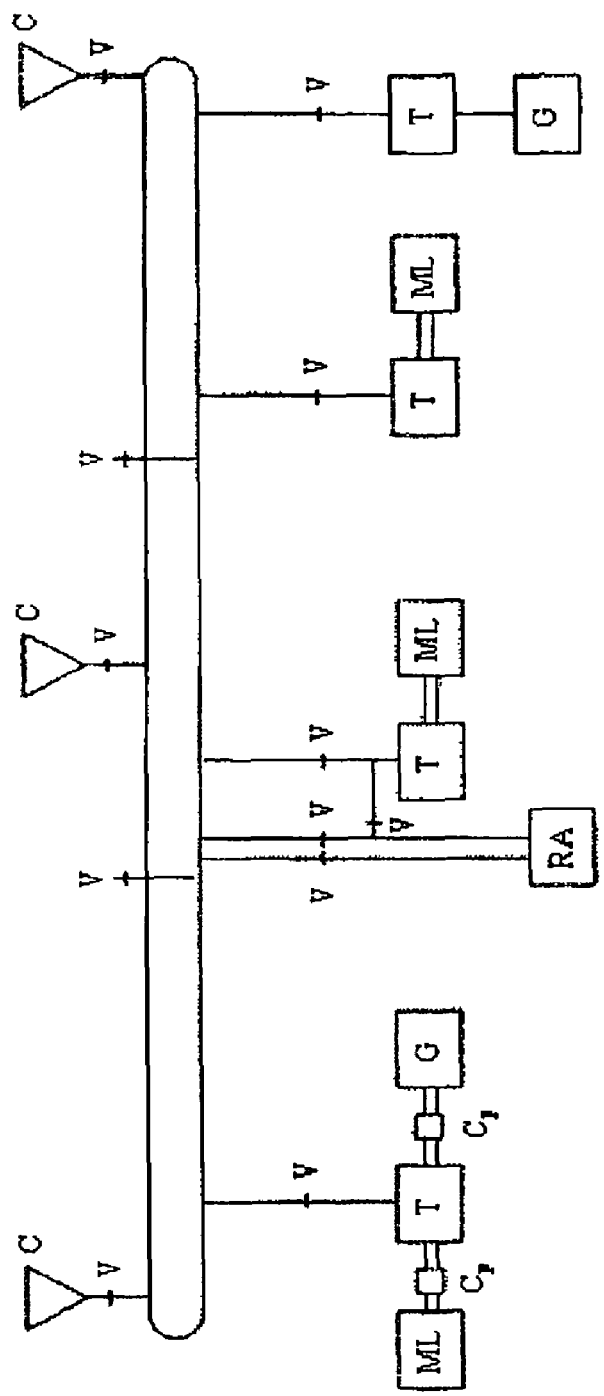
FIG. 4 is a schematic block diagram showing the structure of a grid of the invention.

The fourth application of the invention refers to a complex aeolian system (aeolian grid), which uses the energy of the captured wind, via one or more collecting concentrators, in several plants which convert this energy in electrical, mechanical or thermal energy. The simplified structure of an aeolian grid is represented in the FIG. 4, where the single lines represent the pneumatic connections and the double lines represent the mechanical ones. The system contains one or more collecting concentrators C. These collecting concentrators are of the type described in the second or in the third application examples of the invention. All concentrators supply a common collecting pipe of the grid TC; all devices which ensure the energy conversion or air storage are connected to the same collecting pipe. Each device is connected to the collecting pipe through a valve V. Such valves can be also installed on the collecting pipe, in order to ensure separations, if necessary. The grid can include several collecting pipes, can have a ring structure or any other structure, and can have several branches, which can be separated through valves. The energy conversion or storage devices may be of any of the types described in the aforementioned variants presented at the end of the third example of application. It is not necessary to use all these element devices; one can use several devices of the same type, with different characteristics if need be (mainly with different powers). One has represented in the drawings an energy converter from each of the aforementioned variants: a turbine (T) which drives a generator (G) and a working machine (ML) (the coupling among these, denoted with $C_p$, can be rigid or controllable); a turbine which drive only a generator or a working machine; buffer reservoir (RT), which supplies a working machine with compressed air (in the last two cases, ML can also have the significance of a thermal machine, for heating or cooling purposes); an accumulator reservoir RA—the stored air can be recirculated through the collecting pipe, or directly through certain conversion devices, e.g. a turbine.

From the automatic control point of view, the system is multivariable, with control possibilities at the level of each energy converter, by using the corresponding valve. At the global level, the control can be ensured by setting the collecting concentrators by wind direction (if these are implemented as described in the second example of application), or by using valves placed in the air direction, from the concentrator to the collecting pipe (from instance, on the accumulating pipes). The multivariable system control strategy is to ensure maximum air access to the collecting pipe, when the energy converters do not work at their maximum capacity, and to reposition one or more concentrators or admission valves towards the collecting pipe, when all air energy using devices (including the accumulator reservoirs) are loaded to the their maximum capacity.

From the energetic standpoint, the system ensures great flexibility in supplying different energy-consuming devices and in providing variations into very large limits of the wind speed. If the system also supplies small local power consumers, it is useful to introduce in the system a turbine—generator set with a small power, which will work as a unique air consumer when the air circulates with low speeds. There are convenient supplying options for different situations, taking into account the energy necessities and the available wind energy. It is even possible to ensure a constant (prescribed) power which is delivered to the electric grid for a rather long time. The existence of the accumulator pipes and reservoirs allows the system to achieve the smoothing of the generated power curve, in case of wind deficiencies, for time periods depending on the reservoir capacities and the energy consumption.

Finally, one must note that some of described devices and systems refer to ground based aeolian systems, but all aforementioned observations can be transposed for the off-shore aeolian systems.

The collecting concentrator for turbine and the aeolian grid presented in this invention have the following advantages:

They allow for the effective and efficient use of the kinetic energy of a great quantity of wind, making possible the achievement of such systems on a large scale of powers, including very high powers. Also, the plant is operative for very low wind speeds, significantly smaller than admissible limits of currently existing wind stations.

They ensure a high rotation speed of the turbine, thus avoiding the use of a speed mechanical multiplier, or of a generator with big number of poles.

They allow the placement of the turbine and of the generator (or other machine) on the ground level.

They allow the use of a tower or of sustainable studs with low height, which results in the decrease of the tower's price (note that the tower is the most expensive component of the current wind stations).

The above mentioned facts generate the decrease in the assembling and maintenance costs of the wind power stations.

The use of some expanding chambers or of some accumulator reservoirs allows the system to achieve the smoothing of the generated power curve, in case of high frequency variations or of wind deficiencies. In the latter case, the system can generate a constant power for a long duration of time, which depends on the characteristics of the accumulator reservoir and of the station. The decrease in the variations of power (and in the variations of torque, respectively) improves the general operating conditions of the system and increases its reliability, by decreasing the intensity of shocks.

The control of the turbine speed can be easily achieved. In case of high wind speeds, the system remains operational and it does not have to be blocked.

The turbine can be used not only for generating electrical energy, but also for driving a machine which develops a useful work or generates heating or cooling. The direct use of air energy for the aforementioned purposes is also possible.

The complex aeolian systems (aeolian grids) ensure a high operating flexibility, depending on the demand and on the wind energy. This flexibility is particularly important if one of the system's components becomes defective.

The power delivered by such a system can vary within broad ranges. The system can ensure a constant power for the electrical grid or for the local energy consumers. The prescribed constant power can be generated for duration of time which can be forecasted based on meteorological data.

The proposed wind energy conversion system is very useful if it is connected to an electrical grid. Indeed, the system can generate a constant high power for a long duration of time and eliminates all drawbacks of the current wind stations interconnected with electrical grids. The control of and the solutions for the connection of the proposed system to the electrical grid are similar with the ones met in classical power stations (for instance, a synchronous generator, directly coupled with the grid, like in a thermoelectric power station).

The invention claimed is:

1. A fixed convergent collecting concentrator, wherein,
    the concentrator contains two spaced-apart, co-axial, approximately horizontal, concentric plates with approximately circular shape centered on a vertical axis, the space between said plates being defined by vertical partition walls radially disposed about the axis thereof, which connect to the plates to form a plurality of sectors such that, irrespective of the direction of the wind, the sectors which are active in that the sectors are oriented so as to receive currently incoming wind, collect and concentrate the air flow which enters the respective sectors, the sectors not so oriented being considered inactive sectors, each sector being connected to an intermediate passage which is in fluid communication with an accumulating tube, thus forming a system of passages which is oriented in a common direction, optionally towards the ground, and
    wherein the concentrator is adapted to connect with a turbine or other engine adapted for energy conversion, the turbine or other engine being placed external to the concentrator or tubes.

2. The convergent collecting concentrator of claim 1, wherein the horizontal plates of circular shape are oriented as sections of a frustum of a cone with its base directed orthogonally away from the central axis.

3. The collecting concentrator according to claim 1, wherein
    each sector is equipped with a clack valve placed inside the sector, or at the end of the intermediate passage tube of the sector,
    each clack valve being opened or closed by the air flux, so that the clack valves of the active sectors are opened while the ones of the inactive sectors are closed, thus blocking the air leakages through the inactive sectors.

4. The collecting concentrator according to claim 2, wherein
    each sector is equipped with a clack valve placed inside the sector, or at the end of the intermediate passage of the sector, each clack valve being opened or closed by the air flux, so that the clack valves of the active sectors are opened while the ones of the inactive sectors are closed, thus blocking the air leakages through the inactive sectors.

5. A wind power station containing a concentrator as defined in claim 1, the concentrator, through the intermediate passages and accumulator tube, supplying an encapsulated turbine, the energy conversion devices being preferably placed at ground level, or, underground, or, alternatively, on a floating ensemble of the off-shore stations, the control and limitation of the speed of the turbine being achieved by positioning of valves allowing air admission in the turbine, the air surplus being evacuated or stored.

6. The wind power station according to claim 5, wherein it is equipped with an expansion chamber of a relatively small volume inserted between the concentrator and the turbine for attenuating of the wind speed high frequency variations, the desired pressure and speed of the air at the input of the turbine being obtained by the sizing and form of the said chamber.

7. The wind power station according to claim 5, wherein, in order to ensure the working of the said station even for long windless periods, the power station further comprises an appropriately located, supplementary accumulating reservoir for pressured air storage, the desired pressure being ensured, if necessary, by a compressor driven by a turbine from the wind station during normal wind flow periods, the pressured air being accumulated based on the wind kinetic energy.

8. A wind power grid containing at least two concentrators as defined claim 1, which discharge the air into a accumulating tube of the wind power grid, or into a grid of such accumulating tubes and these pipes supply at least two turbines which drive electrical generators or engines which use mechanical energy or, said pipes supply other users of air pressure or accumulating reservoirs, and all engines are preferably placed on the ground level or on a floating ensemble for off-shore stations.

9. A wind power grid containing at least two several concentrators as defined claim 2, which discharge the air into an accumulating tube of the wind power grid, or into a grid of such accumulating tubes and these pipes supply at least two turbines which drive electrical generators or engines which use mechanical energy or, said pipes supply other users of air pressure or accumulating reservoirs, and wherein all engines are preferably placed on the ground level or on a floating ensemble for off-shore stations.

10. The wind power grid according to claim 8, wherein the accumulating tube grid contains branches and sub-branches, each branch or sub-branch of the accumulating tubes of the wind power grid and each air energy conversion engine are connected through a valve and the multivariable automatic control of the system uses mainly these valves, thus ensuring a simple control of the generated voltage and frequency and, therefore, a simple possibility of connection to the electrical grid, the problems regarding the connection to the grid being also ameliorated because a wind power grid can work during rather long time even in lack of the wind conditions, based on the potential energy of the accumulated air.

11. The wind power grid according to claim 9, wherein the accumulating tube grid contains branches and sub-branches, each branch or sub-branch of the accumulating tubes of the wind power grid and each air energy conversion engine are connected through a valve and the multivariable automatic control of the system uses mainly these valves, thus ensuring a simple control of the generated voltage and frequency and, therefore, a simple possibility of connection to the electrical grid, the problems regarding the connection to the grid being also ameliorated because a wind power grid can work during rather long time even in lack of the wind conditions, based on the potential energy of the accumulated air.

12. A wind power station containing at least a concentrator as defined in claim 2, the concentrator, through an ensemble of tubes, supplying an encapsulated turbine, the energy conversion devices being preferably placed at ground level, or, underground, or, alternatively, on a floating ensemble of the off-shore stations, the control and limitation of the speed of the turbine being achieved by positioning of valves allowing air admission in the turbine, the air surplus being evacuated or stored.

13. The wind power station according to claim 12, wherein, in order to ensure the working of the said station even for long windless periods, the power station further comprises an appropriately located, supplementary accumulating reservoir for pressured air storage, the desired pressure being ensured, if necessary, by a compressor driven by a turbine from the wind station during normal wind flow periods, the pressured air being accumulated based on the wind kinetic energy.

14. A wind power grid,
wherein, the grid contains at least two concentrators having an orientable collecting concentrator for capturing moving air or other gas, in order to extract kinetic energy in the air, or to store pressured air, the concentrator being rotatably mounted and having vertically oriented input and output sections associated having an area, the area of the input section being greater than that of the output section, the concentrator being adapted to be oriented depending on the wind direction and which is connected with other elements through intermediate passages, said passages being adapted to be oriented towards a turbine or other engines and wherein the concentrator is adapted to connect with a turbine or other engine adapted for energy conversion, the turbine or other engine being placed external to the concentrator or tubes, the intermediate passages further discharging the air into an accumulating tube of the wind power grid, or into a grid of such accumulating tubes which supply at least two turbines which drive electrical air energy compression generators or engines, the generators or motors using mechanical energy or, said pipes supply other users of air pressure or accumulating reservoirs,
wherein the engines are preferably placed on the ground level or on a floating ensemble for off-shore stations.

15. The wind power grid according to claim 14, wherein the accumulating tube grid contains branches and sub-branches, each branch or sub-branch of the accumulating tubes of the grid and each air energy conversion engine are connected through a valve and the multivariable automatic control of the system uses mainly these valves, thus ensuring a simple control of the generated voltage and frequency and, therefore, a simple possibility of connection to the electrical grid, the problems regarding the connection to the grid being also ameliorated because a wind power grid can work during rather long time even in lack of the wind conditions, based on the potential energy of the accumulated air.

* * * * *